US009078275B2

(12) United States Patent
Ko et al.

(10) Patent No.: US 9,078,275 B2
(45) Date of Patent: Jul. 7, 2015

(54) BLUETOOTH LOW ENERGY AND LTE COEXISTENCE ENHANCEMENTS

(71) Applicant: MEDIATEK, INC., Hsin-Chu (TW)

(72) Inventors: Li-Chun Ko, Taipei (TW); Huanchun Ye, Cupertino, CA (US); Shuo-Jen Hsu, Hsinchu (TW); I-Kang Fu, Taipei (TW)

(73) Assignee: MEDIATEK INC. (TW)

( * ) Notice: Subject to any disclaimer, the term of this patent is extended or adjusted under 35 U.S.C. 154(b) by 119 days.

(21) Appl. No.: 14/017,546

(22) Filed: Sep. 4, 2013

(65) Prior Publication Data

US 2014/0064212 A1    Mar. 6, 2014

Related U.S. Application Data

(60) Provisional application No. 61/697,150, filed on Sep. 5, 2012.

(51) Int. Cl.

| | |
|---|---|
| *H04Q 7/24* | (2006.01) |
| *H04W 72/12* | (2009.01) |
| *H04L 1/00* | (2006.01) |
| *H04W 28/06* | (2009.01) |
| *H04W 84/18* | (2009.01) |
| *H04W 88/06* | (2009.01) |

(52) U.S. Cl.
CPC .......... *H04W 72/1215* (2013.01); *H04W 28/06* (2013.01); *H04W 84/18* (2013.01); *H04W 88/06* (2013.01); *H04L 1/0083* (2013.01)

(58) Field of Classification Search
CPC .................................. H04W 72/1215

USPC .......................... 370/328, 336, 338; 455/41.2
See application file for complete search history.

(56) References Cited

U.S. PATENT DOCUMENTS

| | | | |
|---|---|---|---|
| 2009/0279588 A1* | 11/2009 | Mochizuki .................... | 375/137 |
| 2010/0317289 A1* | 12/2010 | Desai et al. .................. | 455/41.2 |
| 2012/0033645 A1* | 2/2012 | Mantravadi et al. .......... | 370/336 |
| 2012/0052802 A1 | 3/2012 | Kasslin et al. ............... | 455/41.2 |

FOREIGN PATENT DOCUMENTS

| | | |
|---|---|---|
| CN | 102378365 A | 3/2012 |
| WO | WO2012018947 A1 | 2/2012 |

OTHER PUBLICATIONS

International Search Report and Written Opinion of International Search Authority for PCT/CN2013/082993 dated Dec. 19, 2013 (10 pages).

* cited by examiner

*Primary Examiner* — Wanda Z Russell
(74) *Attorney, Agent, or Firm* — Zheng Jin (57) ABSTRACT

Methods for preventing coexistence interference between a Bluetooth Low Energy (BLE) radio and a collocated LTE radio are provided. In a first solution, the BLE radio adds padding bytes to BLE packets such that the total packet length falls in a specific range to prevent coexistence interference. In a second solution, the BLE radio limits the total BLE packet length to a predefined length to prevent coexistence interference. In a third solution, the data rate for transmitting the BLE packets is higher than a predefined rate to prevent coexistence interference. In a fourth solution, the BLE radio dynamically adjusts the time inter-frame-spacing (T_IFS) value to prevent coexistence interference with the collocated LTE radio.

20 Claims, 8 Drawing Sheets

BLE SLAVE FLOW CHART

SOLUTION 2 AND SOLUTION 3 FLOW CHART

SOLUTION 4 FLOW CHART

FIG. 15

BLUETOOTH LOW ENERGY AND LTE COEXISTENCE ENHANCEMENTS

CROSS REFERENCE TO RELATED APPLICATIONS

This application claims priority under 35 U.S.C. §119 from U.S. Provisional Application No. 61/697,150, entitled "Bluetooth LE and LTE Coexistence Enhancements," filed on Sep. 5, 2012, the subject matter of which is incorporated herein by reference.

TECHNICAL FIELD

The disclosed embodiments relate generally to wireless network communications, and, more particularly, to Multi-Radio Terminals (MRT) containing Long Term Evolution (LTE) radio frequency (RF) module and Bluetooth low energy (BLE) RF module.

BACKGROUND

As the demand for wireless communication continues to increase, wireless communication devices such as cellular telephones, personal digital assistants (PDAs), smart handheld devices including Smartphones, laptop computers, tablet computers, etc., are increasingly being equipped with multiple radio transceivers. A multiple radio terminal (MRT) may simultaneously include a Long-Term Evolution (LTE) or LTE-Advanced (LTE-A) radio, a Wireless Local Area Network (WLAN, e.g., WiFi) access radio, and a Bluetooth or Bluetooth Low Energy (BLE) radio. Due to radio spectrum regulation, different technologies may operate in overlapping or adjacent radio spectrums. For example, LTE/LTE-A Time Division Duplex (TDD) mode (Band 40) often operate at 2.300-2.400 GHz, WiFi often operate at 2.400-2.483.5 GHz, and Bluetooth or BLE often operate at 2.402-2.480 GHz.

Simultaneous operation of multiple radio modules co-located on the same physical device, however, can suffer significant degradation including significant interference between them because of the overlapping or adjacent radio spectrums. Due to physical proximity and radio power leakage, when the transmission of data for a first radio module overlaps with the reception of data for a second radio module in time domain, the second radio module reception can suffer due to interference from the first radio module transmission. Likewise, data transmission of the second radio module can interfere with data reception of the first radio module.

Figure 1:
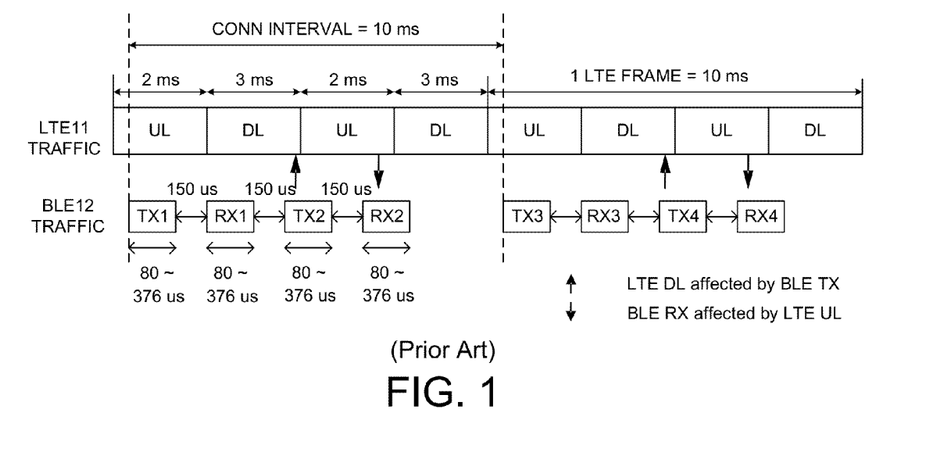
FIG. 1 (Prior Art) is a diagram that illustrates coexistence interference between a BLE device and a co-located LTE radio module.

FIG. 1 (Prior Art) is a diagram that illustrates interference between a LTE radio module LTE11 and a BLE master radio module BLE12 that are co-located in a multiple radio terminal MRT10. In LTE TDD mode, LTE11 transmits and receives data via scheduled uplink (UL) transmitting and downlink (DL) receiving time slots on a frame-by-frame basis. For example, each LTE frame is 10 ms. For TDD configuration #1, each frame contains a scheduled 2 ms UL for transmitting operation followed by a scheduled 3 ms DL for receiving operation, and so on so forth. On the other hand, for BLE operation, a BLE master and a BLE slave alternate one or more pairs of TX transmission and RX reception during a connection interval. A time inter-frame-spacing (T_IFS) separates each TX and RX operation. For example, each connection interval is 10 ms, and contains two TX-RX pairs. Each T_IFS is 150 us long, and each TX/RX operation ranges from 80-376 us with 1 Mbps data rate. Because LTE11 and BLE12 radio modules are co-located within MRT10, in a general, the transmission of one radio module will interfere with the concurrent reception of another radio module. As illustrated in FIG. 1, data transmission in TX2 of BLE12 interferes concurrent DL data reception of LTE11, and data reception in RX2 of BLE12 is interfered by concurrent UL data transmission of LTE11. Similarly, data transmission in TX4 of BLE12 interferes concurrent DL data reception of LTE11, and data reception in RX4 of BLE12 is interfered by concurrent UL data transmission of LTE11. (Please note that for the purpose of illustration, the time scale of related parts in FIG. 1 is incorrect.)

Filters are often used to mitigate such coexistence interference when there is more than 30 MHz frequency guard band separating the interfering frequencies. Imperfect TX filter design, however, may still result in unacceptable coexistence interference. In addition, to save filtering cost, a pure TDM (Time Division Multiplexing) solution is still preferred, especially when there is only limited frequency guard band. Therefore, the TX/RX timing of a BLE data packet can be aligned with the LTE UL/DL period by selecting an anchor point of the connection interval to prevent coexistence interference.

Figure 2:
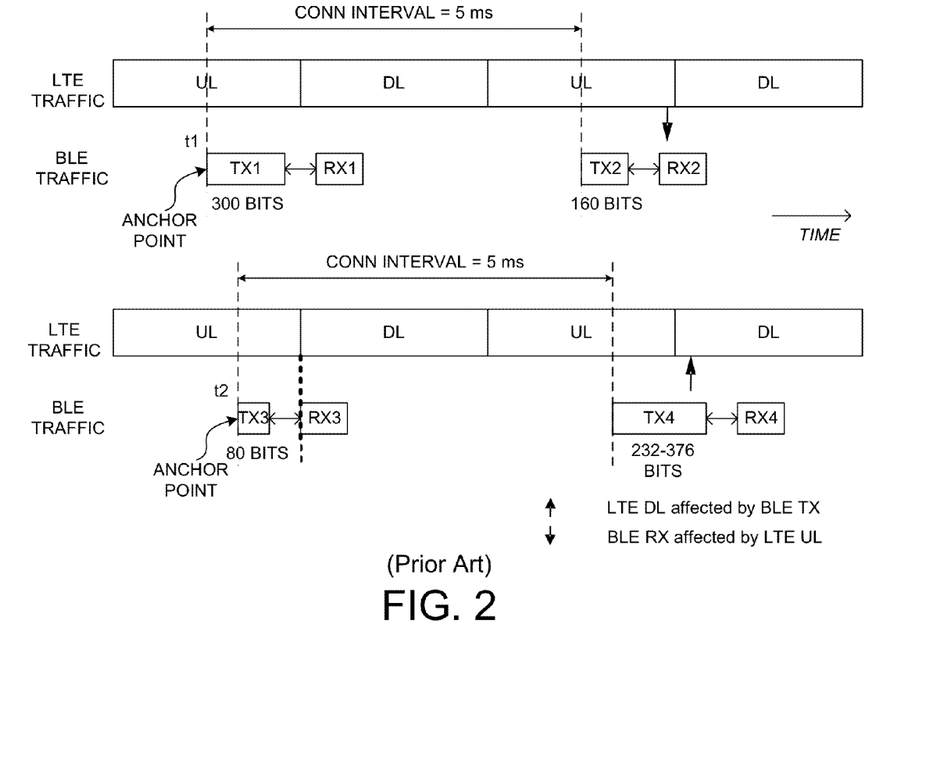
FIG. 2 (Prior Art) is a diagram that illustrates a TDM solution for preventing interference between a BLE master device and a co-located LTE radio module.

FIG. 2 (Prior Art) is a diagram that illustrates a TDM solution for preventing coexistence interference between a BLE master device and a co-located LTE radio module. As shown in the top half of FIG. 2, each connection interval contains one TX-RX pair and is 5 ms long for BLE operation, and an anchor point is selected at time t1. For BLE data transmission, the data packet in TX1 is 300 bits long, while the data packet in TX2 is 160 bits long. It can be seen that by selecting the anchor point at t1, there is no coexistence interference for TX1/RX1. However, when the data packet in TX2 becomes shorter, the BLE data reception in RX2 is interfered by the concurrent UL transmission of the collocated LTE radio module. On the other hand, as shown in the bottom half of FIG. 2, each connection interval contains one TX-RX pair and is 5 ms long for BLE operation, and an anchor point is selected at time t2. In this example, the data packet in TX3 is 80 bits long, while the data packet in TX4 is 232-376 bits long. In can be seen that by selecting the anchor point at t2, there is no coexistence interference for TX1/RX1 even for the shortest empty payload packet in TX3. However, when the data packet in TX4 becomes longer, the BLE data transmission in TX4 interferes the concurrent DL reception of the collocated LTE radio module. Therefore, carefully aligning BLE TX/RX with LTE UL/DL may not work as the BLE packet length changes. A solution is sought to prevent coexistence interference between BLE device and collocated LTE radio module effectively.

SUMMARY

Methods for preventing coexistence interference between a Bluetooth Low Energy (BLE) radio and a collocated LTE radio are provided.

In a first solution, the BLE radio adds padding bytes to BLE packets such that the total packet length falls in a specific range to prevent coexistence interference. The BLE radio first selects a connection interval to align a BLE connection event with the frame timing of the collocated LTE traffic to prevent coexistence interference when the length of a BLE packet falls in a specific range. The BLE radio then checks the length of the BLE data packet and verifies if corresponding data transmission and reception will interfere with the LTE traffic. If there is potential interference, then the BLE radio adds padding bytes to the BLE data packet such that the total length of the padded packet falls within the specific range to prevent interference. In one embodiment, the collocated BLE radio is a BLE slave, which determines a desired connection interval based on the LTE traffic pattern. A slave-initiated connection update procedure is provided to adjust the connection interval to prevent coexistence interference.

In a second solution, the BLE radio limits the total BLE packet length to a predefined length to prevent coexistence interference. The BLE radio selects a connection interval and anchor time to align a BLE connection event with a frame timing of the collocated LTE radio. With proper alignment, the BLE data transmission and following data reception do not interfere with the LTE traffic when a data transmission time of the BLE data packet is within a specific range. In this solution, the data transmission time is within the specific range by limiting the data packet length to a predefined length, which is based on T_IFS.

In a third solution, the data rate for transmitting the BLE packets is higher than a predefined rate to prevent coexistence interference. The BLE radio selects a connection interval and anchor time to align a BLE connection event with a frame timing of the collocated LTE radio. With proper alignment, the BLE data transmission and following data reception do not interfere with the LTE traffic when a data transmission time of the BLE data packet is within a specific range. In this solution, the data transmission time is within the specific range by increasing the data rate to a predefined rate, which is based on T_IFS.

In a fourth solution, the BLE radio dynamically adjusts the time inter-frame-spacing (T_IFS) value to prevent coexistence interference with the collocated LTE radio. The BLE radio first selects a connection interval and anchor point such that the data transmission of the data packet does not interfere any DL reception of the collocated LTE device. The BLE radio then adjusts the default T_IFS length such that the following data reception is not interfered by any UL transmission of the collocated LTE radio. The T_IFS adjustment is determined based on the LTE traffic pattern and the transmitted BLE data packet length dynamically.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 3:
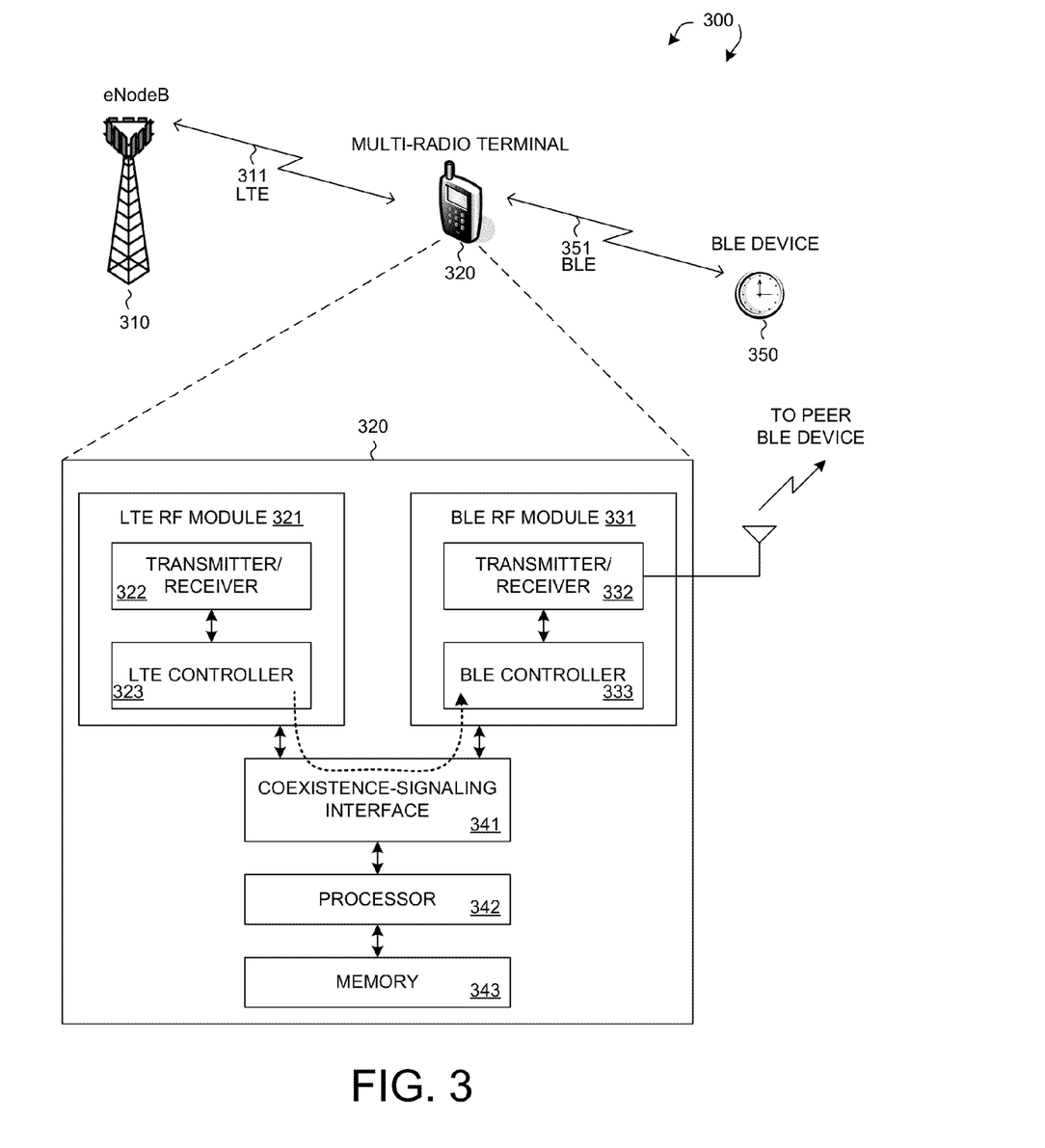
FIG. 3 illustrates a simplified block diagram of a Multi-Ratio Terminal (MRT) having a LTE radio module and a BLE device in a wireless communication system in accordance with one novel aspect.

FIG. 3 illustrates a simplified block diagram of a Multi-Ratio Terminal (MRT) in a wireless communication system 300 in accordance with one novel aspect. Wireless communication system 300 comprises a base station (e.g., eNodeB in LTE systems) eNB 310, an MRT (e.g., a user equipment in LTE systems) UE 320, and a peer Bluetooth low energy (BLE) device BLE 350. UE 320 simultaneously includes an LTE radio module 321 and a BLE radio module 331. UE 320 communicates with its serving base station eNB 310 using LTE radio module 321 via a cellular/LTE link 311, and communicates with peer BLE 350 using BLE radio module 331 via a BLE link 351. LTE radio module 321 comprises a transmitter and/or receiver 322 and an LTE driver controller 323. BLE radio module 331 comprises a transmitter and/or receiver 332 and a BLE driver controller 333. The transceivers are coupled with antennas to receive RF signals and convert them into baseband signals. The transceivers also convert received baseband signals, convert them into RF signals, and send them out to the antennas. LTE driver 323 and BLE driver 333 communicate with each other via a coexistence-signaling interface 341. Coexistence-signaling interface 341 is also connected to processor 342 and memory 343 of UE 320. Processor 342 processes the received baseband signals and invokes different functional modules to perform features in the UE. Memory 343 stores program instructions and data to control the operations of the UE. Although coexistence-signaling interface 341 is denoted as one module, it may be a functional module and include hardware, software, and firmware implementation, similar to the LTE and BLE RF modules. For example, hardware implementation may be used for timing/synchronization between LTE 321 and BLE 331, while software implementation may be used for traffic information exchange.

In the example of FIG. 3, LTE radio module 321 is an LTE radio module that operates at 2.300-2.400 GHz in TDD mode, while BLE radio module 331 is a BLE radio module that operates at 2.402-2.480 GHz. Simultaneous operation of multiple radio modules co-located on the same physical device, however, can suffer significant degradation including significant interference between them because of the overlapping or adjacent radio spectrums. This is especially true when both LTE 321 and BLE 331 use TDD mode for data communication. Under TDD mode, when a scheduled communication time for data transmission for a first radio module overlaps in time with a scheduled communication time for data reception for a second radio module, data reception of the second radio module can suffer due to interference from data transmission of the first radio module. Likewise, data transmission of the second radio module can interfere with data reception of the first radio module because of concurrently scheduled data transmission and reception.

In one novel aspect, BLE radio module 331 applies various solutions to prevent coexistence interference with LTE radio module 45. As illustrated in FIG. 3, BLE 331 first obtains traffic pattern information of LTE 321 via coexistence-signaling interface 341. The traffic pattern information includes frame configuration information such as DL/UL duration and frame length. Based on the traffic pattern, BLE 331 selects a proper connection interval to align BLE connection event with the frame timing of LTE traffic. In a first solution, BLE 331 adds padding bytes to BLE packets such that the total packet length falls in a specific range to prevent coexistence interference. In a second solution, BLE 331 limits the total BLE packet length to the specific range to prevent coexistence interference. In a third solution, the data rate for transmitting the BLE packets is higher than a predefined rate to prevent coexistence interference. In a fourth solution, BLE 331 dynamically adjusts the time inter-frame-spacing (T_IFS) value to prevent coexistence interference. Various embodiments and examples for each solution are described below with more details.

Figure 4:
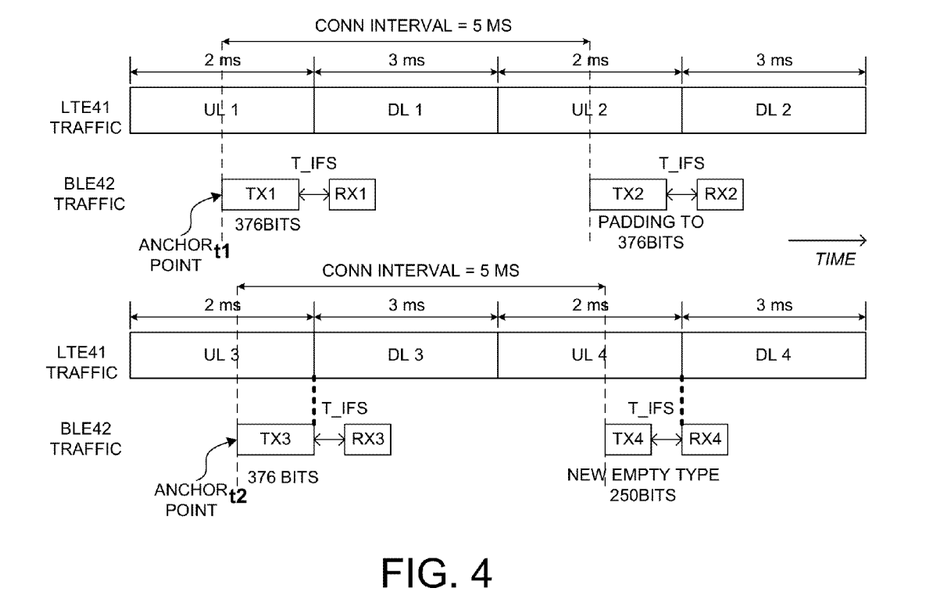
FIG. 4 illustrates a first solution of allowing padding bytes in BLE data packets to prevent co-existing interference in accordance with one novel aspect.

FIG. 4 illustrates a first solution of allowing padding bytes in BLE data packets to prevent co-existing interference in accordance with one novel aspect. FIG. 4 shows LTE traffic pattern of an LTE RF module 41 and BLE traffic pattern of a collocated BLE RF module 42. In LTE TDD mode, LTE RF module transmits and receives data via scheduled uplink (UL) transmitting and downlink (DL) receiving time slots on a frame-by-frame basis. For example, each LTE frame is 10 ms. For TDD configuration #1, each frame contains a scheduled 2 ms UL for transmitting operation followed by a scheduled 3 ms DL for receiving operation, and so on so forth. On the other hand, for BLE operation, a BLE master and a BLE slave alternate one or more pairs of TX transmission and RX reception during a connection interval. A time inter-frame-spacing (T_IFS) separates each TX and RX operation. For example, each connection interval is 5 ms, and contains one or more TX-RX pairs. Each T_IFS is 150 us long, and each TX/RX operation ranges from 80-376 us with 1 Mbps data rate. Because LTE41 and BLE42 are co-located in the same device platform, with proper connection interval selection, BLE42 adds padding to BLE data packets such that the transmission of one radio module does not overlap in time with the reception of another radio module.

In a first example of FIG. 4, an anchor point for each connection interval is selected at time t1, which is located within an UL duration UL1 of a LTE frame. The connection interval is selected as multiples of LTE UL+DL duration to create periodicity. In addition, each connection interval contains only one TX-RX pair. The first BLE data packet to be transmitted in TX1 is a longest data packet defined in BLE. The longest data packet has a length of 47 bytes (1 byte of preamble+4 bytes of access address+2 bytes of payload header+37 bytes of payload+3 bytes of CRC). If the BLE data transmission rate is 1 Mbps, then the transmission time for data packet in TX1 is 47*8=376 us. By selecting anchor point t1 properly, the entire data transmission TX1 falls within the UL duration UL1 of the LTE frame, while the following data reception RX1 falls within the DL duration DL1 of the LTE frame. In the next connection interval, a second BLE data packet is to be transmitted in TX2. The original second data packet may be much shorter in length, e.g., a data packet with only 120 bits. To prevent coexistence interference, BLE42 adds padding bytes to the second data packet such that the padded data packet is also equal to 376 bits. This way, the entire data transmission TX2 after padding falls within the UL duration UL2 of the LTE frame, while the following data reception RX2 falls within the DL duration DL2 of the LTE frame. It can be seen that with proper connection interval selection, there is no concurrent transmission and reception between BLE42 and LTE41 if each BLE data packet is padded to the maximum data packet length (376 bits) as defined in BLE.

In a second example of FIG. 4, an anchor point for each connection interval is selected at time t2, which is located within an UL duration UL3 of a LTE frame. Similar to the first example, the connection interval is selected as multiples of LTE UL+DL duration to create periodicity. In addition, each connection interval contains only one TX-RX pair. In the second example, however, the anchor point t2 is selected such that the ending of data transmission TX3 of a longest BLE data packet (with or without padding bits) aligns with the ending the UL duration UL3 of the LTE frame. In the next connection interval, another BLE data packet is to be transmitted in TX4. This BLE data packet may be an empty payload data packet, e.g. having a total length of 80 bits without any payload. To prevent coexistence interference, BLE42 adds padding bytes to the empty data packet such that the padded data packet is at least 376−150=226 bits. This way, the entire data transmission TX4 after padding plus T_IFS falls within the UL duration UL4 of the LTE frame, while the starting of the following data reception RX4 aligns within the starting of DL duration DL4 of the LTE frame. It can be seen that with proper connection interval selection, there is no concurrent transmission and reception between BLE42 and LTE41 if each BLE data packet is padded to a data packet length of at least 226 bits. This is because T_IFS=150 us, which corresponds to 150 bits with 1 Mbps data rate. The 150 us thus provides extra flexibility for alignment, and extra energy saving can be achieved by adding less padding bytes to BLE data packets. Alternatively, a new empty payload data packet with a length of 240 bits (instead of 80 bits) can be defined.

Figure 5:
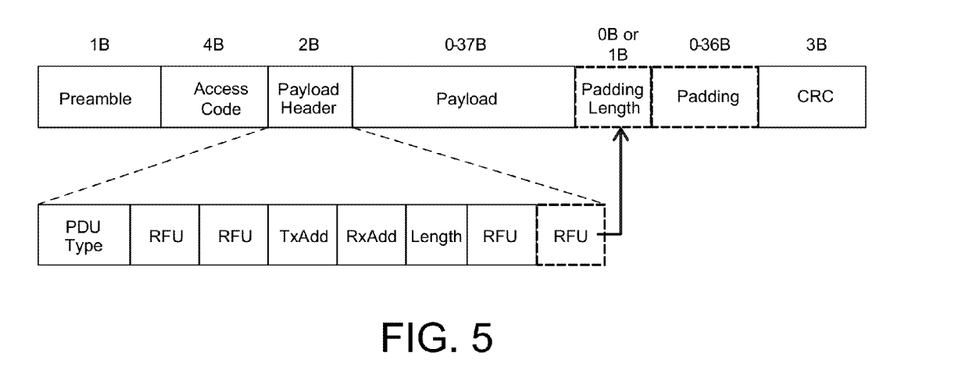
FIG. 5 illustrates an example of BLE data packets with padding length indication and padding.

FIG. 5 illustrates an example of BLE data packets with padding length indication and padding. Each BLE data packet comprises one byte of preamble, four bytes of access address, two bytes of payload header, 0-37 bytes of payload, and three bytes of CRC. The payload header further comprises PDU type, TX address, RX address, length, and several RFU bits that are reserved for future use. In one novel aspect, one of the RFU bits is used to indicate the existence of padding length at the transmitter side. For example, a digital "0" indicates no padding, while a digital "1" indicates padding. If padding is indicated, then a 1-byte padding length field is located immediately after the payload. The value of the padding length field indicates the number of bytes in padding that follows the padding length field. The actual number of padding bytes is determined by the transmitter based on the original payload length. If padding is not indicated, then there is no padding length field, nor any padding. At the receiver side, upon receiving each data packet, the receiver is able to know the padding length based on the padding and padding length indication.

In the above-illustrated example, the connection interval is multiples of LTE UL+DL duration to create periodicity. In addition, in order to prevent coexistence interference, only one TX-RX pair is allowed in each connection interval. As a result, BLE throughput is limited by the length of the connection interval. If BLE controller has many packets waiting to be sent, then the connection interval should be a short period to gain throughput. On the other hand, if BLE controller has no packet to be sent, then the connection interval should be a long period to save energy.

Figure 6:
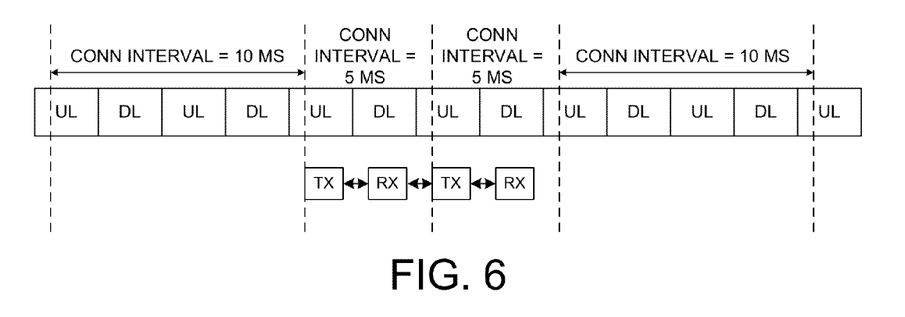
FIG. 6 illustrates one embodiment of dynamic connection interval update to save energy in accordance with one novel aspect.

FIG. 6 illustrates one embodiment of dynamic connection interval update to save energy in accordance with one novel aspect. In the example of FIG. 6, When the BLE connection has just established, the BLE device has no packet to be sent, so a connection interval is set to 10 ms. Later on, when data packets arrive, the connection interval is changed to 5 ms to gain throughput. After the packets are transferred, the connection interval is changed back to 10 ms to save power consumption.

Figure 7:
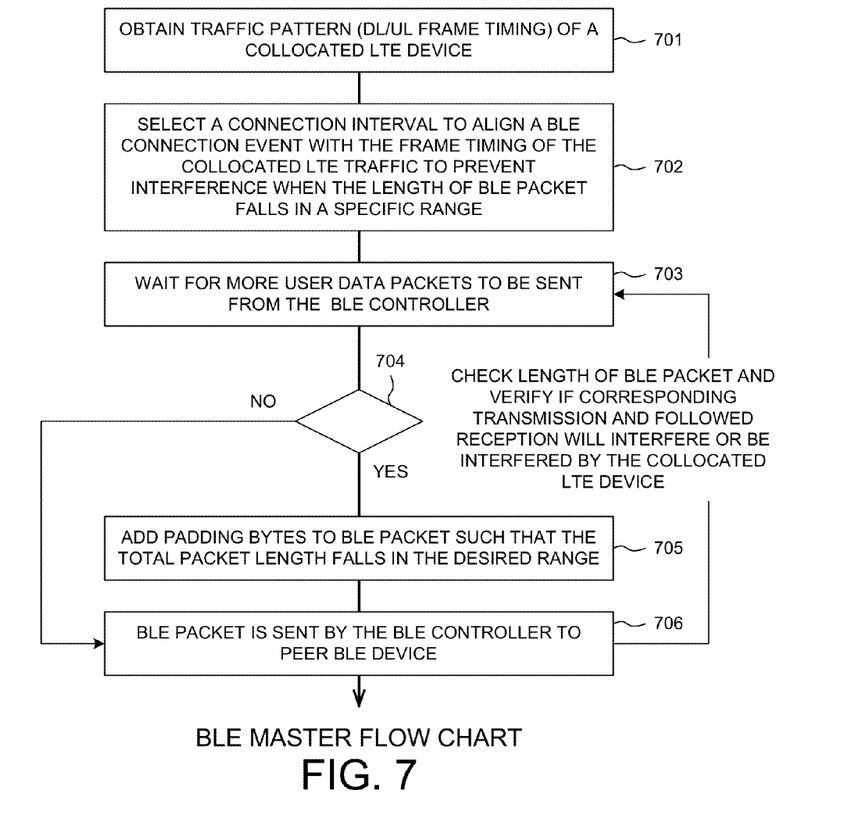
FIG. 7 is a flow chart of preventing co-existence interference from a BLE master perspective in accordance with one novel aspect.

FIG. 7 is a flow chart of preventing co-existence interference from a BLE master perspective in accordance with one novel aspect. In step 701, a BLE master device obtains traffic pattern information of a collocated LTE radio module. The LTE traffic pattern information LTE frame configuration information such as DL/UL duration and frame length. In step 702, the BLE master selects a connection interval to align a BLE connection event with the frame timing of the collocated LTE traffic to prevent coexistence interference when the length of BLE packet falls in a specific range. In step 703, the BLE master waits for more user data packets from the host to be transmitted by the BLE controller. In step 704, the BLE master checks the length of a BLE data packet and verifies if corresponding data transmission and reception will interfere with the LTE traffic. If no interference, then the BLE controller transmits the BLE packet to a peer BLE device in step 706 and goes back to step 703. If there is potential interference, then the BLE master adds padding bytes to the BLE packet such that the total packet length after padding falls in the specific range (step 705). The BLE controller then transmits the padded BLE packet to a peer BLE device in step 706 and goes back to step 703. In one embodiment, the specific range is based on a maximum BLE data packet length and the T_IFS.

In BLE communication between a BLE master and a peer BLE slave device, only the BLE master determines the connection interval, selects the anchor point, and adds padding bytes to BLE packets. The BLE slave, on the other hand, is not allowed to make such decisions. For an MRT, however, either a BLE master or a BLE slave may coexist with an LTE radio module on the same device platform. If a BLE slave coexists with the LTE radio module, then it would be necessary for the BLE slave to initiate any necessary connection interval update.

Figure 8:
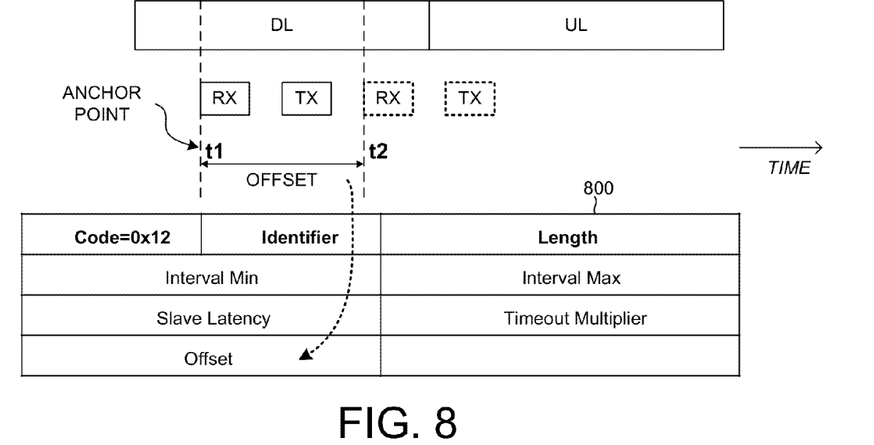
FIG. 8 illustrates one example of a slave initiated connection interval update by adding a new offset field in L2 CAP packet.

FIG. 8 illustrates one example of a slave initiated connection interval update by adding a new offset field in L2CAP (Logic Link Control and Adaptation Protocol) packet. FIG. 8 shows an LTE traffic pattern having a DL duration followed by an UL duration. For a collocated BLE slave device, it alternates RX and TX operation during a connection interval starting at an original anchor point t1. Based on the anchor point, however, the BLE TX operation overlaps with the DL duration of the LTE device thus interferes with the reception of DL LTE traffic. It is thus desirable that the anchor point can be moved to time t2 after applying a delaying offset. In the example of FIG. 8, the BLE slave communicates such offset value to the BLE master via an L2CAP packet 800. Upon receiving the L2CAP packet 800, the BLE master is then able to retrieve the offset and adjust the connection interval with the desired anchor point.

Figure 9:
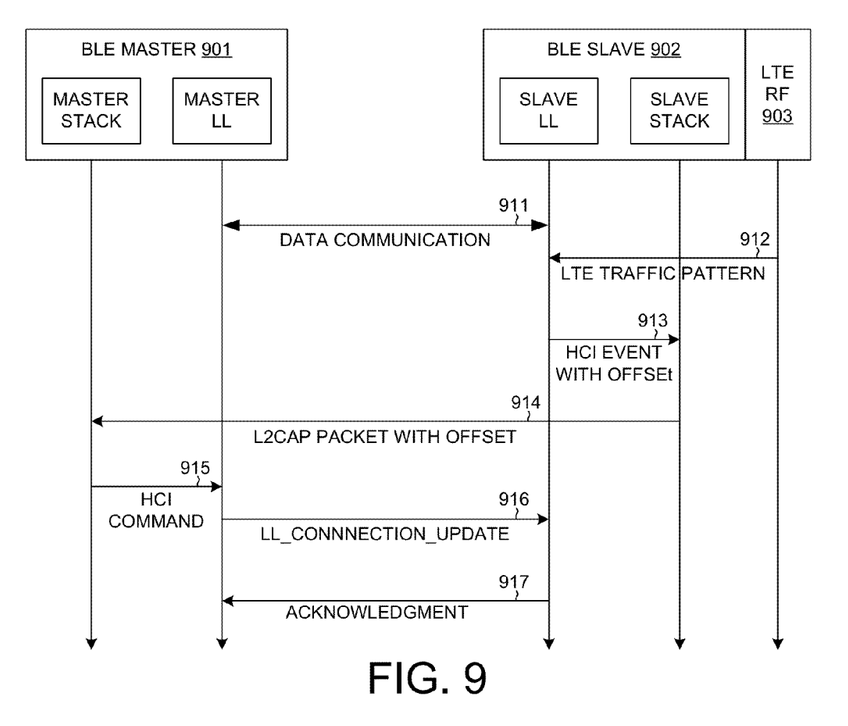
FIG. 9 illustrates one example of a slave initiated connection interval update procedure.

FIG. 9 illustrates one example of a slave initiated connection update procedure. In the example of FIG. 9, a BLE master 901 communicates with a peer BLE slave 902, which is collocated with another LTE RF module 903 in the same device platform. BLE master 901 comprises a master stack and a master link layer (LL) module, and BLE slave comprises a slave stack and a slave LL module. In step 911, the BLE master and BLE slave establish a BLE connection for data communication. The BLE connection has an existing connection interval decided by the BLE master 901. In step 912, the slave LL module obtains LTE traffic pattern of the collocated LTE RF module 903. Based on the LTE traffic pattern, the slave LL is able to determine a desired connection interval to prevent coexistence interference. The slave LL then calculates an offset between the desired connection interval and the existing connection interval (e.g., the offset between anchor point t2 and t1 as illustrated in FIG. 8). In step 913, the slave LL module sends an HCI (Host Control Interface) event with offset information to the slave stack. In step 914, the slave stack sends an L2CAP packet with offset to the master stack, which sends an HCI command with offset to the master LL module in step 915. In step 916, the master LL module sends a connection update to the slave LL module to update the connection interval, and receives an ACK from the slave LL module in step 917. The BLE connection is then updated with the desired connection interval to prevent coexistence interference.

Figure 10:
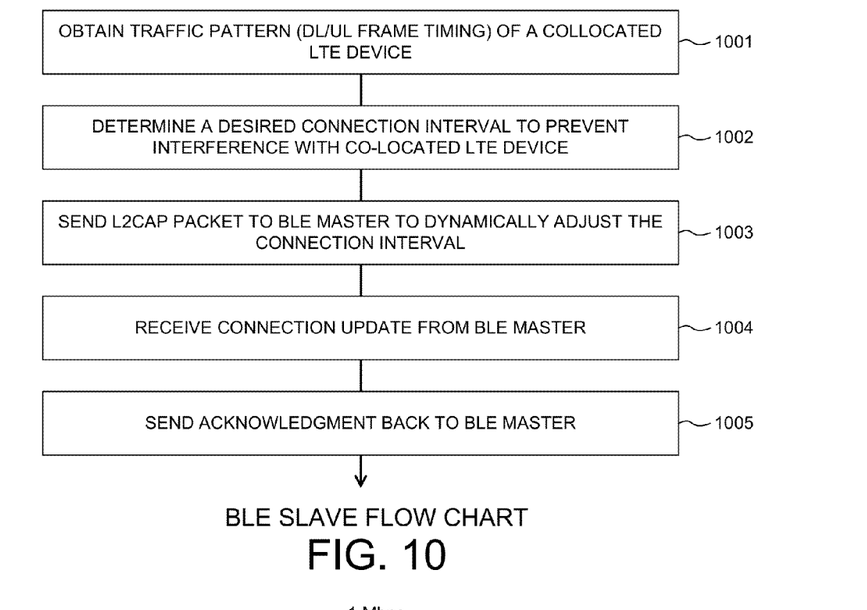
FIG. 10 is a flow chart of preventing co-existence interference from a BLE slave perspective in accordance with one novel aspect.

FIG. 10 is a flow chart of preventing co-existence interference from a BLE slave perspective in accordance with one novel aspect. In step 1001, a BLE slave device obtains traffic pattern information of a collocated LTE radio module. The LTE traffic pattern information LTE frame configuration information such as DL/UL duration and frame length. In step 1002, the BLE slave determines a desired connection interval to prevent coexistence interference with the collocated LTE radio module. The desired connection interval may be indicated by an anchor point offset. In step 1003, the BLE slave sends an L2CAP packet to a BLE master with the offset information. In step 1004, the BLE slave receives a connection update from the BLE master to adjust the connection interval with the offset information. In step 1005, the BLE slave sends an acknowledgment back to the BLE master to complete the connection interval update.

Figure 11:
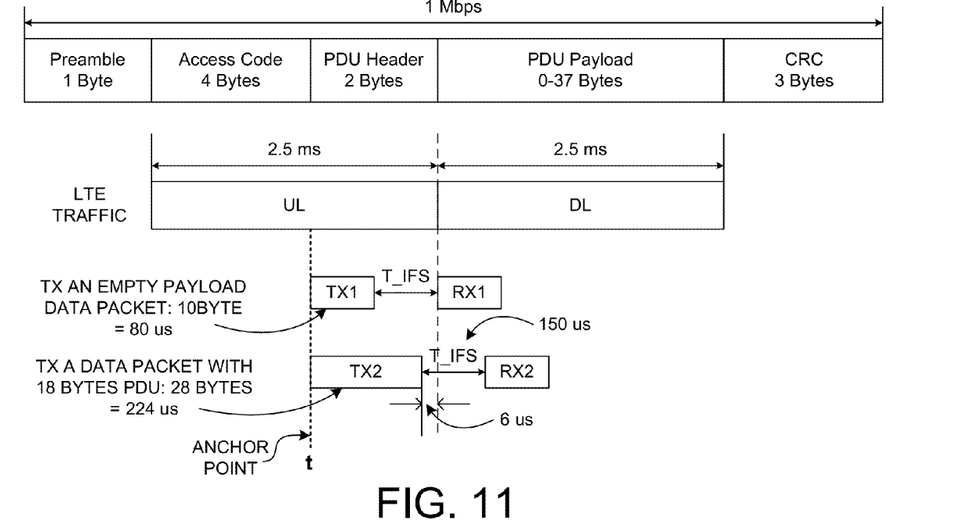
FIG. 11 illustrates a second solution of limiting BLE data packet length to prevent co-existing interference in accordance with one novel aspect.

FIG. 11 illustrates a second solution of limiting BLE data packet length to prevent co-existing interference in accordance with one novel aspect. As illustrated in FIG. 11, Every BLE data packet comprises one byte of preamble, four bytes of access address, two bytes of payload header, 0-37 bytes of payload, and three bytes of CRC. Therefore, each BLE data packet ranges from 80 bits (e.g., an empty payload data packet) to 376 bits (e.g., a data packet with maximum payload of 37 bytes). With 1 Mbps data rate, the transmission time for an empty payload data packet is 80 us, while the transmission time for the longest BLE data packet is 376 us.

In one novel aspect, the anchor point of a BLE connection interval is selected such that a BLE packet with payload size limited to a specific range does not result in coexistence interference with collocated LTE traffic. In the example of FIG. 11, the anchor point t is selected such that the starting of a BLE reception operation (RX1) is aligned to the ending of an LTE UL duration after a BLE transmission operation (TX1) of an empty payload data packet. With such alignment, the BLE data reception will not be interfered by the LTE UL transmission. In addition, because the T_IFS is defined to be 150 us in BLE, if the transmission operation of a BLE packet is less than 80+150=230 us, then there will be no overlapping between the BLE transmission and any LTE DL duration. Thus, if the BLE packet length is limited to 28 bytes with 18 bytes payload, e.g., 28*8=224 us<230 us, then the BLE data transmission TX2 will not interfere any LTE DL reception. As a result, there will be no coexisting interference between BLE and collocated LTE radio.

Figure 12:
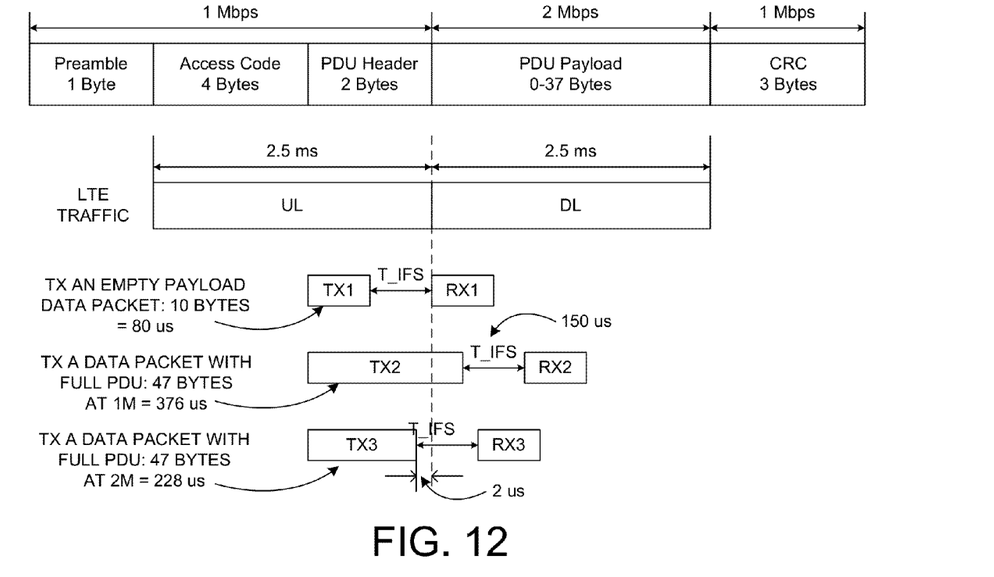
FIG. 12 illustrates a third solution of selecting anchor point with high BLE data rate to prevent co-existing interference in accordance with one novel aspect.

FIG. 12 illustrates a third solution of selecting anchor point with high BLE data rate to prevent co-existing interference in accordance with one novel aspect. Similar to FIG. 11, as illustrated in FIG. 12, Every BLE data packet comprises one byte of preamble, four bytes of access address, two bytes of payload header, 0-37 bytes of payload, and three bytes of CRC. Therefore, each BLE data packet ranges from 80 bits (e.g., an empty payload data packet) to 376 bits (e.g., a data packet with maximum payload of 37 bytes). With 1 Mbps data transmission rate, the transmission time for the longest data packet is 376 us. However, if the data rate for payload is increased to 2 Mbps, then the transmission time for the longest data packet is 80 us+148 us=228 us. Alternatively, if the data rate for the entire packet is increased to 2 Mbs, then the transmission time for the longest packet is only 40 us+148 us=188 us.

In one novel aspect, the anchor point of a BLE connection interval is selected such that a BLE packet with any payload size does not result in coexistence interference with collocated LTE traffic at a specific data rate. In the example of FIG. 12, the anchor point t is selected such that the starting of a BLE reception operation (RX1) is aligned to the ending of an LTE UL duration after a BLE transmission operation (TX1) of an empty payload data packet. With such alignment, the BLE data reception will not be interfered by the LTE UL transmission. In addition, because the T_IFS is defined to be 150 us in BLE, if the transmission operation of a BLE packet is less than 80+150=230 us, then there will be no overlapping between the BLE transmission and any LTE DL duration. However, if the BLE data rate is 1 Mbps, then the transmission time TX2 for the longest BLE packet is 376 us, which is longer than 230 us. On the other hand, if the BLE data rate for payload transmission is increased to 2 Mbps, then the transmission time TX3 of the longest BLE packet is 228 us (<230 us), which guarantees no coexisting interference between BLE and collocated LTE radio. Therefore, by increasing the BLE data rate, coexisting interference can be prevented with a proper connection interval and anchor point selection.

Figure 13:
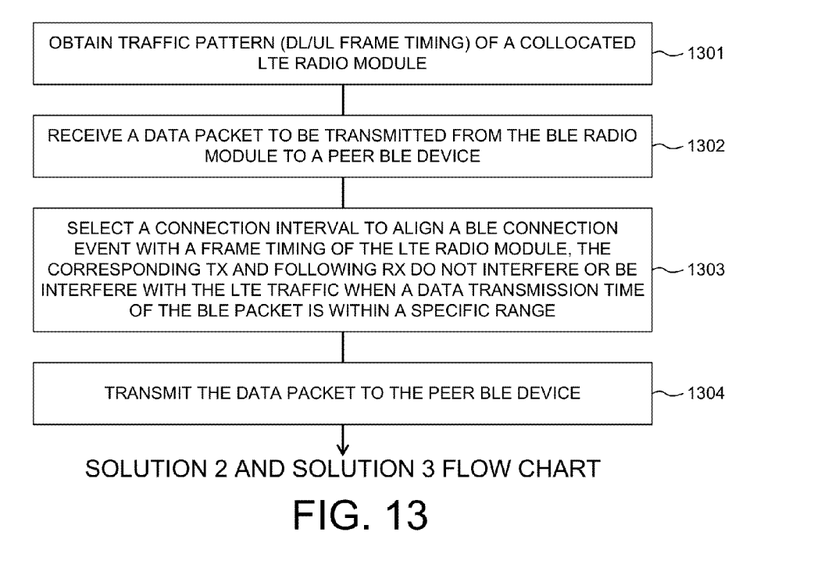
FIG. 13 is a flow chart of preventing co-existence interference via the second and the third solution in accordance with one novel aspect.

FIG. 13 is a flow chart of preventing co-existence interference via the second and the third solution in accordance with one novel aspect. In step 1301, a BLE radio module obtains traffic pattern information of a collocated LTE radio module. The LTE traffic pattern information LTE frame configuration information such as DL/UL duration and frame length. In step 1302, the BLE radio module receives a BLE data packet to be transmitted from the BLE radio module to a peer BLE device. In step 1503, the BLE radio module selects a connection interval and anchor time to align a BLE connection event with a frame timing of the collocated LTE radio module. With proper alignment, the corresponding BLE data transmission and the following BLE data reception do not interfere or be interfered by the LTE traffic when a data transmission time of the BLE data packet is within a specific range. In step 1304, the BLE radio module transmits the BLE data packet to the peer BLE device. Each BLE data transmission and the following BLE data reception is separated with a fixed time inter-frame-spacing (T_IFS). In one example, the BLE data packet has a packet length smaller than a predefined length based on the T_IFS. In another example, the data rate for transmitting the entire BLE data packet or the payload of the BLE data packet is higher than a predefined rate based on the T_IFS.

Figure 14:
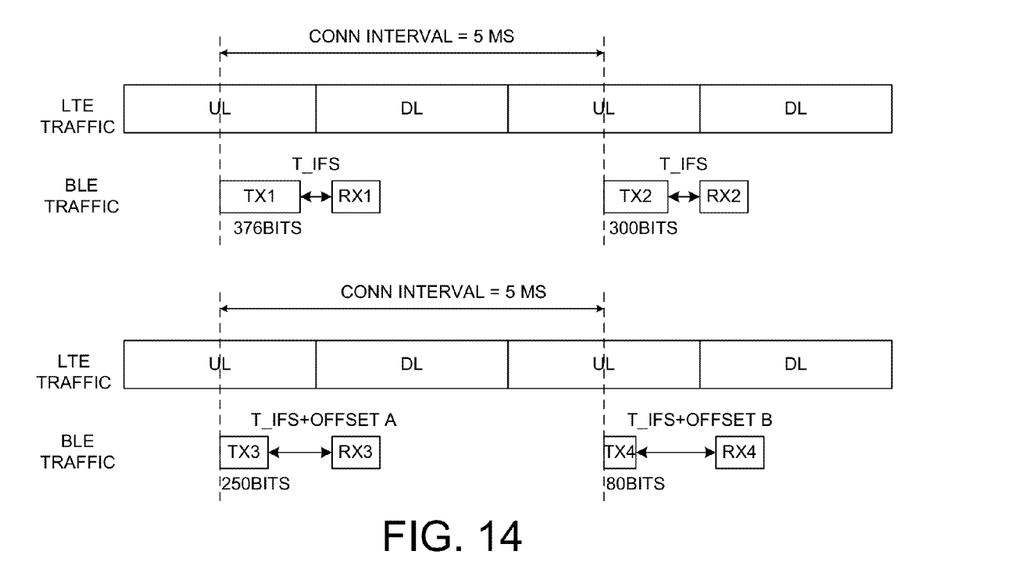
FIG. 14 illustrates a fourth solution of dynamically adjusting BLE T_IFS to prevent co-existing interference in accordance with one novel aspect.

FIG. 14 illustrates a fourth solution of dynamically adjusting BLE T_IFS to prevent co-existing interference in accordance with one novel aspect. With fixed T_IFS, it is difficult to prevent concurrent BLE transmission and LTE reception or concurrent BLE reception and LTE transmission. In one novel aspect, the T_IFS length is dynamically adjusted based on the length of the data packet to be transmitted and the LTE frame timing such that the following BLE reception is not interfered by LTE UL transmission. As illustrated in FIG. 14, a connection interval is first selected such that data transmission TX1 does not interfere any LTE DL reception. The length of TX1 lasts 376 us for transmitting a longest BLE packet with 376 bits. If the next transmission TX2 is reduced to 300 us for transmitting a 300 bits packet, then there still is no coexistence interference because the original T_IFS length introduces some level of flexibility. However, if the next transmission TX3 is reduced to 250 us for transmitting a 250 bits data packet, then the original T_IFS length is not sufficient, and is therefore increased with a first offset value 'A' such that the following reception RX3 is not interfered by any LTE UL transmission. Finally, if the next transmission TX4 is further reduced to 80 us for transmitting an empty payload data packet, then the original T_IFS is increased with a second offset value 'B', which is longer than offset value 'A', such that the following reception RX4 is not interfered by any LTE UL transmission.

Figure 15:
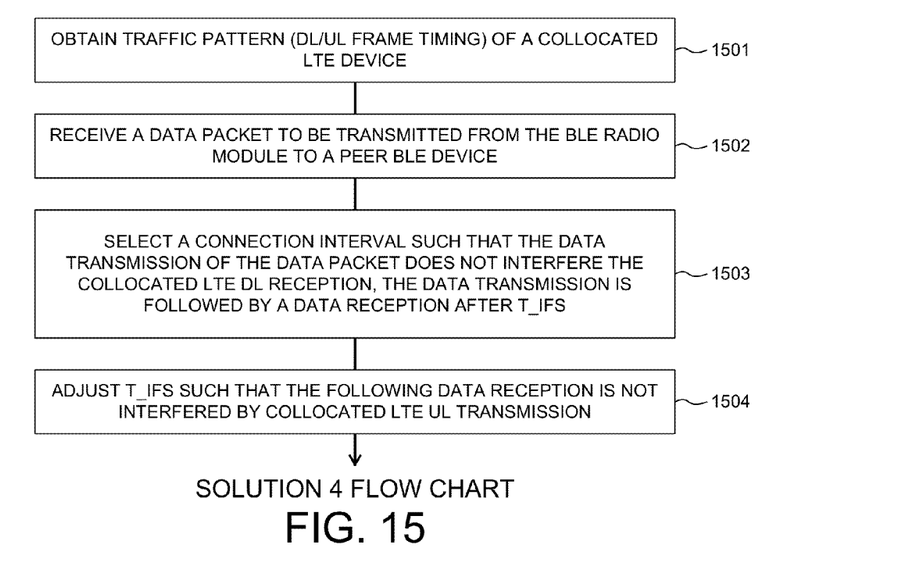
FIG. 15 is a flow chart of preventing co-existence interference via the fourth solution in accordance with one novel aspect.

FIG. 15 is a flow chart of preventing co-existence interference via the fourth solution in accordance with one novel aspect. In step 1501, a BLE radio module obtains traffic pattern information of a collocated LTE radio module. The LTE traffic pattern information LTE frame configuration information such as DL/UL duration and frame length. In step 1502, the BLE radio module receives a data packet to be transmitted from the BLE radio module to a peer BLE device. In step 1503, the BLE radio module selects a connection interval and anchor point such that the data transmission of the data packet does not interfere any DL reception of the collocated LTE device. The data transmission operation is followed by a data reception operation after a default T_IFS. In step 1504, the BLE radio module adjusts the default T_IFS length such that the following data reception is not interfered by any UL transmission of the collocated LTE device. The T_IFS adjustment is based on the LTE traffic pattern and the transmitted data packet length.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   obtaining traffic pattern information of a long term evolution (LTE) radio module by a collocated Bluetooth low energy (BLE) radio module;
   selecting a connection interval to align a BLE connection event with a frame timing of the collocated LTE radio module;
   receiving a data packet needs to be transmitted by the BLE radio module; and adding padding bytes to the data packet such that the corresponding BLE data transmission and following data reception do not interfere or be interfered by the collocated LTE radio module.

2. The method of claim 1, wherein an anchor point of the connection interval is selected such that the BLE data transmission or the following data reception do not interfere or be interfered with the collocated LTE device when a length of the data packet after padding falls within a specific range.

3. The method of claim 2, wherein each BLE data transmission and following data reception are separated with a fixed time inter-frame-spacing (T_IFS), and wherein the specific range is based on a maximum BLE data packet length and the T_IFS.

4. The method of claim 1, wherein the BLE radio module is a BLE master.

5. The method of claim 1, wherein the data packet comprises a payload header indicating whether the data packet contains a padding length that indicates a number of bytes in padding.

6. The method of claim 5, wherein the padding length is based on an original payload length of the data packet.

7. The method of claim 5, wherein the data packet is an empty payload data packet that has a non-zero number of padding bytes after the payload header.

8. The method of claim 1, wherein the connection interval contains only one data transmission followed by one data reception, and wherein a duration of the connection interval is dynamically adjusted.

9. A method comprising:
obtaining traffic pattern information of a long term evolution (LTE) radio module by a collocated Bluetooth low energy (BLE) radio module;
determining a desired connection interval based on the traffic pattern information such that the corresponding data reception and following data transmission is not interfered by or interfere the collocated LTE traffic;
transmitting a link layer control and adaptation packet to a peer BLE device; and
receiving a link layer connection update for adjusting to the desired connection interval.

10. The method of claim 9, wherein the BLE radio module is a BLE slave, and wherein the peer BLE device is a BLE master.

11. The method of claim 9, wherein the desired connection interval is indicated by an anchor point offset contained in the link layer control and adaptation packet.

12. The method of claim 11, wherein the BLE radio module determines the anchor point offset via receiving an event from a link layer sub-module.

13. A method comprising:
obtaining traffic pattern information of a long term evolution (LTE) radio module by a collocated Bluetooth low energy (BLE) radio module;
receiving a BLE data packet needs to be transmitted by the BLE radio module;
selecting a connection interval to align a BLE connection event with a frame timing of the LTE radio module, wherein the corresponding BLE data transmission and following BLE data reception do not interfere or be interfered with the collocated LTE traffic when a data transmission time of the BLE data packet is within is a specific range; and
transmitting the BLE data packet to a BLE peer device.

14. The method of claim 13, wherein each BLE data transmission and following BLE data reception is separated with a fixed time inter-frame-spacing (T_IFS).

15. The method of claim 14, wherein the BLE data packet has a packet length smaller than a predefined length based on the T_IFS.

16. The method of claim 14, wherein the data rate for transmitting the entire BLE data packet is higher than a predefined rate based on the T_IFS.

17. The method of claim 14, wherein the data rate for transmitting a payload of the BLE data packet is higher than a predefined rate based on the T_IFS.

18. A method comprising:
obtaining traffic pattern information of a long term evolution (LTE) radio module by a collocated Bluetooth low energy (BLE) radio module;
receiving a data packet to be transmitted by the BLE radio module;
selecting a connection interval such that the data transmission of the data packet does not interfere data reception of the collocated LTE radio module, wherein the data transmission is followed by a data reception after a time inter-frame-spacing (T_IFS); and
adjusting the T_IIFS such that the following data reception is not interfered by data transmission of the collocated LTE radio module.

19. The method of claim 18, wherein the BLE radio module is a BLE master, and wherein the adjusted T_IFS is delivered from the BLE master to a BLE slave.

20. The method of claim 18, wherein the T_IFS adjustment is determined based on the LTE traffic pattern information and the data packet length.

* * * * *